United States Patent
Saitoh et al.

(10) Patent No.: US 11,548,959 B2
(45) Date of Patent: Jan. 10, 2023

(54) PHOTOCURABLE MATERIAL COMPOSITION AND CURED PRODUCT THEREOF

(71) Applicant: CANON KABUSHIKI KAISHA, Tokyo (JP)

(72) Inventors: Terunobu Saitoh, Hachioji (JP); Manami Tomizuka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 16/679,586

(22) Filed: Nov. 11, 2019

(65) Prior Publication Data

US 2020/0157258 A1 May 21, 2020

(30) Foreign Application Priority Data

Nov. 19, 2018 (JP) .............................. JP2018-216483

(51) Int. Cl.
| | | |
|---|---|---|
| *B29C 64/135* | (2017.01) | |
| *C08F 22/22* | (2006.01) | |
| *B33Y 70/00* | (2020.01) | |
| *B33Y 10/00* | (2015.01) | |
| B29K 33/00 | (2006.01) | |
| B29K 75/00 | (2006.01) | |

(52) U.S. Cl.
CPC .............. *C08F 22/22* (2013.01); *B33Y 10/00* (2014.12); *B33Y 70/00* (2014.12); *B29C 64/135* (2017.08); *B29K 2033/08* (2013.01); *B29K 2075/00* (2013.01)

(58) Field of Classification Search
CPC ... B33Y 70/00; B33Y 10/00; C08F 222/1065; C08F 22/22; C08F 222/106; B29C 64/124; B29C 2075/00; B29C 64/106; B29C 64/135; B29K 2033/08
See application file for complete search history.

(56) References Cited

U.S. PATENT DOCUMENTS

2009/0081437 A1* 3/2009 Mizutani ............... C08F 283/10
522/135
2012/0282427 A1* 11/2012 Tsutsumi ............. C08G 18/755
264/494

FOREIGN PATENT DOCUMENTS

| CN | 102640220 A | 8/2012 |
| CN | 105399913 A | 3/2016 |
| JP | 2007-2144 A | 1/2007 |
| JP | 2016-188308 A | 11/2016 |

OTHER PUBLICATIONS

First Office Action in Chinese Application No. 201911111283.6 (Jan. 2022).

* cited by examiner

*Primary Examiner* — Monica A Huson
*Assistant Examiner* — Kelsey C Grace
(74) *Attorney, Agent, or Firm* — Venable LLP

(57) ABSTRACT

Provided are a photocurable material composition providing a cured product, which achieves both of a heat deflection temperature of 70° C. or more measured by Method A of JIS K 7191-1 and a Charpy impact strength of 6 kJ/m$^2$ or more measured in conformity with JIS K 7111-1, after UV irradiation, and a cured product thereof. The photocurable material composition includes: 50 parts by weight to 65 parts by weight of a bifunctional urethane (meth)acrylate having (meth)acryloyl groups at both terminals thereof; 15 parts by weight to 25 parts by weight of a compound represented by the formula (4); and 10 parts by weight to 30 parts by weight of at least one of a compound represented by the formula (5) or a compound represented by the formula (6).

9 Claims, No Drawings

PHOTOCURABLE MATERIAL COMPOSITION AND CURED PRODUCT THEREOF

BACKGROUND OF THE INVENTION

Field of the Invention

The present disclosure relates to a photocurable material capable of providing a cured product that has a high thermal deformation temperature and is excellent in impact resistance. The present disclosure also relates to a method of producing a three-dimensional shaped article through optical three-dimensional shaping involving using the photocurable material, and to a method of producing a cured product through casting.

Description of the Related Art

In recent years, a method of three-dimensionally shaping a photocurable material based on three-dimensional data has started to be widely adopted because a target three-dimensional shaped article can be produced with satisfactory dimensional accuracy by the method without the production of any mold or the like.

As a typical example of an optical three-dimensional shaping method, there has been known a pull-down system or pull-up system involving selectively applying computer-controlled UV laser to the liquid surface of a liquid photocurable material loaded into a container so that a desired pattern may be obtained, to thereby cure the photocurable material. In the pull-down system, a three-dimensional shaped article is obtained by continuously repeating the following process. A cured layer is pulled down into the photocurable material so that the photocurable material may be supplied onto the cured layer, and the UV laser is similarly selectively applied to the supplied material to provide a cured product. In addition, in the pull-up system, the three-dimensional shaped article is obtained by continuously repeating the following process. The cured layer is peeled from an interface so that the photocurable material may be poured into a space between the cured layer and the interface, and then the UV laser is similarly applied to the material.

As described in the foregoing, the material to be used in the optical three-dimensional shaping needs to be immediately supplied for curing a next layer. In addition, when the viscosity of the material is high, bubbles are liable to be involved therein. Accordingly, the viscosity is desirably as low as possible.

Meanwhile, a cast cured product requires the production of a mold, and hence the shape of the cured product is limited as compared to the optical three-dimensional shaping method. However, unlike the production of an injection-molded product, a large facility is not required, and a high-precision cured product can be obtained with ease. Accordingly, the cast cured product has been used in, for example, a high-precision part or a part exploiting special performance obtained by mixing dissimilar materials.

As described above, the photocurable material has been widely utilized as a base material for forming a three-dimensional shaped article or mixing dissimilar materials to express special performance.

In general, the mechanical characteristics of the cured product obtained by curing the photocurable material are not as high as those of a thermoplastic resin, and hence a part produced from the photocurable material is rarely used as it is in a product. Accordingly, most cured products obtained by the optical three-dimensional shaping method have been used only as models or parts to be temporarily used. In addition, when the cast cured product is used as a product, its applications are limited only to a small portion of product parts each exploiting its special performance.

Of the mechanical characteristics, in particular, a high thermal deformation temperature and impact resistance are in a trade-off relationship, and hence it has been considered to be difficult to achieve both of these kinds of performance in the cured product using the photocurable material. In general, when an attempt is made to increase the thermal deformation temperature of a cured product, a material having a functional group capable of increasing the crosslinking density of the cured product or a material having a bulky substituent is selected as a material to be used. When the material having a functional group capable of increasing the crosslinking density, such as a polyfunctional acrylic or epoxy material, or the material having a bulky substituent, such as an isobornyl group, is photocured, stress concentration or a curing failure occurs in its curing process. Accordingly, the thermal deformation temperature of the cured product increases, but the impact resistance thereof remarkably reduces.

Meanwhile, when an attempt is made to improve the impact resistance of the cured product, a material capable of reducing the crosslinking density or a material having a rubber-like property is selected as a material to be used. When the material capable of reducing the crosslinking density, such as a high-molecular weight acrylic or epoxy material, or a material having a functional group that can undergo an expansion and contraction motion, such as urethane, is cured, the impact resistance is improved by: the low crosslinking density; or impact absorption by the expansion and contraction motion of a molecule of such material. Meanwhile, the cured product softens, and hence its thermal deformation temperature reduces.

A material for increasing a thermal deformation temperature and a material for improving impact resistance may be used in combination for achieving both of a high thermal deformation temperature and impact resistance. In most cases, however, a cured product in which the advantages of the respective materials are impaired is obtained, and hence a material composition providing a cured product that achieves both of a high thermal deformation temperature and impact resistance in optical three-dimensional shaping or cast shaping has not been found. The cured products of many photocurable materials each have a heat deflection temperature at a load of 1.8 MPa of less than 70° C. measured by Method A of JIS K 7191-1 and a Charpy impact strength of less than 6 kJ/m$^2$ measured in conformity with JIS K 7111-1. Any such cured product causes the following failures. The cured product has a low thermal deformation temperature, and hence a shaped article formed of the cured product is distorted by its own weight. The cured product has low impact resistance, and hence a thin portion thereof is chipped by slight impact.

Under such technical background as described above, in Japanese Patent Application Laid-Open No. 2007-2144, as a material to be used in a transparent cover layer for an optical disc reduced in warping, there is a description of a UV-curable resin composition containing: an ethylenically unsaturated compound that is a urethane acrylate having a molecular weight of from 400 to 10,000 and/or an epoxy acrylate having a molecular weight of from 500 to 10,000; adamantane (meth)acrylate; and a photopolymerization initiator. In addition, in Japanese Patent Application Laid-Open No. 2016-188308, there is a description that a resin composition for optical three-dimensional shaping, which contains a compound having three or more glycidyl-etherified phenol groups and a polyalkylene glycol diglycidyl ether, a polyalkylene glycol di(meth)acrylate and a polyalkylene glycol (mono)methacrylate, a cationic polymerization initiator, and a radical polymerization initiator, provides a three-dimensional shaped article excellent in heat resistance and impact resistance.

However, materials referring to the material compositions described in Japanese Patent Application Laid-Open No. 2007-2144 and Japanese Patent Application Laid-Open No. 2016-188308 have each been unable to achieve both of a heat deflection temperature measured by Method A of JIS K 7191-1 of 70° C. or more and a Charpy impact strength measured in conformity with JIS K 7111-1 of 6 kJ/m$^2$ or more.

SUMMARY OF THE INVENTION

The present disclosure has been made in view of the background art described above. It is an object of the present disclosure to provide a photocurable material composition providing a cured product, which achieves both of a heat deflection temperature of 70° C. or more measured by Method A of JIS K 7191-1 and a Charpy impact strength of 6 kJ/m$^2$ or more measured in conformity with JIS K 7111-1, after UV irradiation, and a cured product thereof. It is another object of the present disclosure to set the viscosity of the photocurable material composition within such a range that the composition can be used in an optical three-dimensional shaping method.

According to aspects of the present disclosure, there are provided a photocurable material composition and a cured product including a copolymer of the photocurable material composition, the photocurable material composition including: 50 parts by weight to 65 parts by weight of a bifunctional urethane (meth)acrylate that includes a structure in which a skeleton represented by the formula (1), and at least one of a repeating structure obtained by linking skeletons each represented by the formula (2) to each other through a bond selected from the group consisting of an ester bond, an ether bond, and a carbonate bond, or a repeating structure obtained by linking skeletons each represented by the formula (3) to each other through a bond selected from the group consisting of an ester bond, an ether bond, and a carbonate bond are linked to a urethane bond, and that has (meth)acryloyl groups at both terminals of the structure; 15 parts by weight to 25 parts by weight of a compound represented by the formula (4); and 10 parts by weight to 30 parts by weight of at least one of a compound represented by the formula (5) or a compound represented by the formula (6):

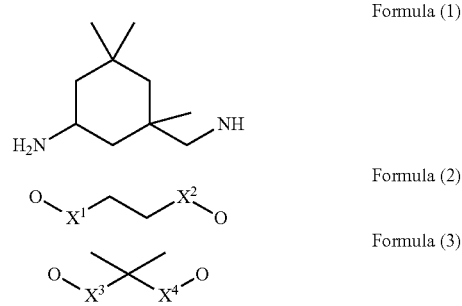

in the formula (1) to the formula (3), $X^1$ to $X^4$ each independently represent $CH_2$ or $C=O$, provided that, when oxygen atoms to which $X^1$ to $X^4$ are bonded each form a urethane bond or a carbonate bond, $X^1$ to $X^4$ each represent $CH_2$;

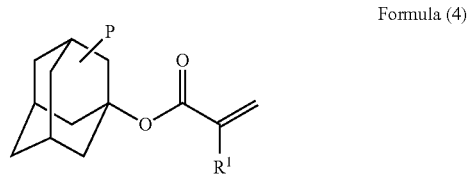

in the formula (4), $R^1$ represents a hydrogen atom or a methyl group, and P represents a polar group;

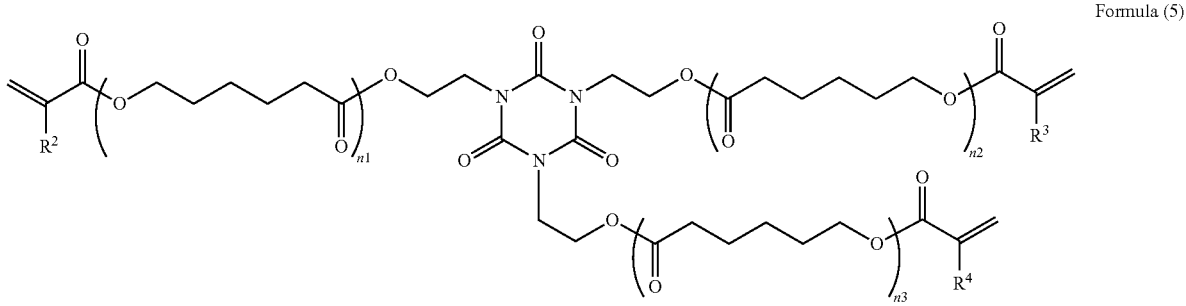

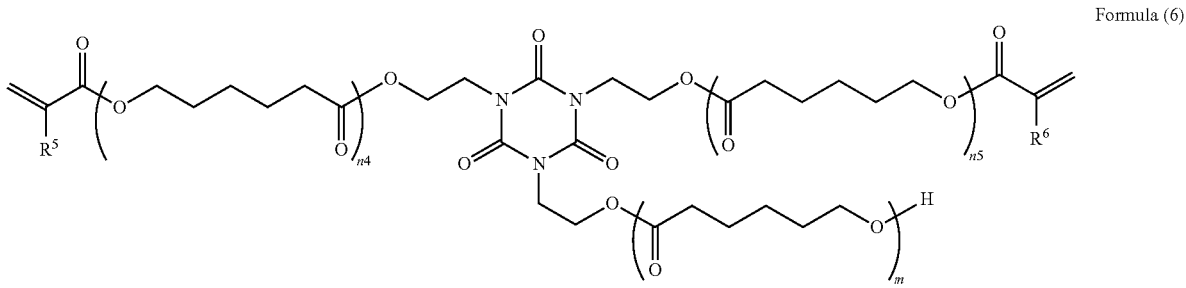

in the formula (5) and the formula (6), $R^2$ to $R^6$ each independently represent a hydrogen atom or a methyl group, "m" represents 0 or 1, n1 to n5 each independently represent an integer of from 0 to 3, n1+n2+n3 is 0 or more and 3 or less, and n4+n5 is 0 or more and 3 or less.

The photocurable material composition according to one aspect of the present disclosure is a base material for forming a three-dimensional shaped article or mixing dissimilar materials to express special performance, and the copolymerization of the photocurable material composition provides the cured product.

The photocurable material composition according to one aspect of the present disclosure provides the cured product through an optical three-dimensional shaping method or shaping based on casting.

According to one aspect of the present disclosure, the photocurable material composition providing a cured product, which achieves both of a heat deflection temperature of 70° C. or more measured by Method A of JIS K 7191-1 and a Charpy impact strength of 6 kJ/m² or more measured in conformity with JIS K 7111-1, through UV irradiation, and the cured product thereof can be provided. Accordingly, when the photocurable material composition according to one aspect of the present disclosure is used, mechanical characteristics that have not been obtained in a related-art UV-curable material are obtained, and hence the composition can be used even in a part in which the related-art UV-curable material has been unable to be used because of its insufficient strength. In addition, when the photocurable material composition according to one aspect of the present disclosure is used in an optical three-dimensional shaping method, not only a model but also a part that can be used as a product can be supplied, and in the case of a product to be produced in a small amount, the product can be directly produced without the use of any mold.

Further features of the present invention will become apparent from the following description of exemplary embodiments.

DESCRIPTION OF THE EMBODIMENTS

The present disclosure is described in detail below.

First, a photocurable material composition according to one aspect of the present disclosure is described.

The photocurable material composition according to one aspect of the present disclosure includes: 50 parts by weight to 65 parts by weight of a bifunctional urethane (meth) acrylate that includes a structure in which a skeleton represented by the formula (1), and at least one of a repeating structure obtained by linking skeletons each represented by the formula (2) to each other through a bond selected from the group consisting of an ester bond, an ether bond, and a carbonate bond, or a repeating structure obtained by linking skeletons each represented by the formula (3) to each other through a bond selected from the group consisting of an ester bond, an ether bond, and a carbonate bond are linked to a urethane bond, and that has (meth)acryloyl groups at both terminals of the structure; 15 parts by weight to 25 parts by weight of a compound represented by the formula (4); and 10 parts by weight to 30 parts by weight of at least one of a compound represented by the formula (5) or a compound represented by the formula (6):

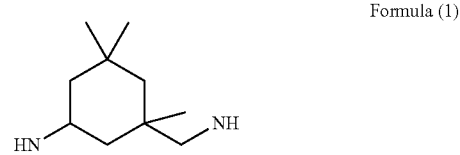

Formula (1)

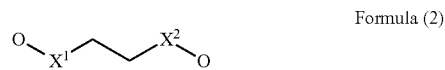

Formula (2)

Formula (3)

in the formula (1) to the formula (3), $X^1$ to $X^4$ each independently represent $CH_2$ or C=O, provided that, when oxygen atoms to which $X^1$ to $X^4$ are bonded each form a urethane bond or a carbonate bond, $X^1$ to $X^4$ each represent $CH_2$;

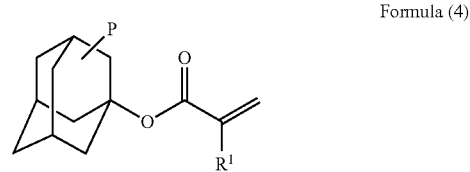

Formula (4)

in the formula (4), $R^1$ represents a hydrogen atom or a methyl group, and P represents a polar group;

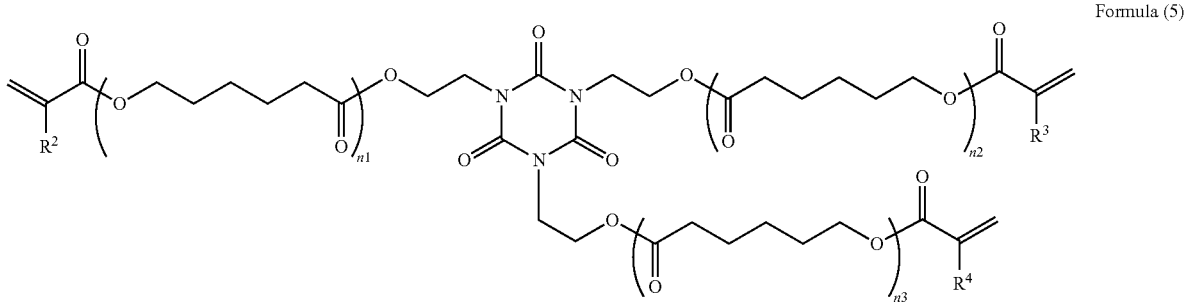

Formula (5)

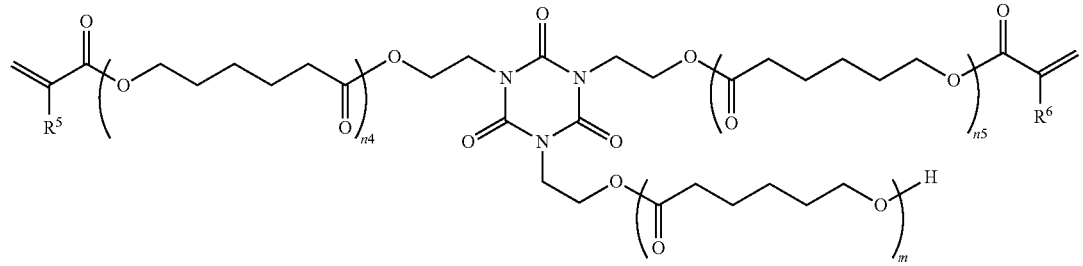

Formula (6)

in the formula (5) and the formula (6), $R^2$ to $R^6$ each independently represent a hydrogen atom or a methyl group, "m" represents 0 or 1, n1 to n5 each independently represent an integer of from 0 to 3, n1+n2+n3 is 0 or more and 3 or less, and n4+n5 is 0 or more and 3 or less.

First, the bifunctional urethane (meth)acrylate is described.

The skeleton represented by the formula (1) is a skeleton derived from isophorone diisocyanate in the structure (hereinafter sometimes referred to as "main skeleton") in which isophorone diisocyanate and at least one of the repeating structure obtained by linking the skeletons each represented by the formula (2) to each other through a bond selected from the group consisting of an ester bond, an ether bond, and a carbonate bond (hereinafter sometimes referred to as "repeating structure of the skeletons each represented by the formula (2)") or the repeating structure obtained by linking the skeletons each represented by the formula (3) to each other through a bond selected from the group consisting of an ester bond, an ether bond, and a carbonate bond (hereinafter sometimes referred to as "repeating structure of the skeletons each represented by the formula (3)") are linked to each other through a urethane bond. The skeleton represented by the formula (1) contains two asymmetric carbon atoms, and encompasses all stereoisomers.

The skeletons each represented by the formula (2) are each a skeleton derived from 1,4-butanediol, 4-hydroxybutanoic acid, or succinic acid. In the case where the skeletons each represented by the formula (2) are linked to each other through an ester bond, in the skeletons each represented by the formula (2), 1,4-butanediol and 4-hydroxybutanoic acid, 1,4-butanediol and succinic acid, the hydroxy group of a 4-hydroxybutanoic acid molecule and the carboxy group of another 4-hydroxybutanoic acid molecule, or the hydroxy group of 4-hydroxybutanoic acid and succinic acid are linked to each other through an ester bond. In the case where the skeletons each represented by the formula (2) are linked to each other through an ether bond, in the skeletons each represented by the formula (2), 1,4-butanediol molecules, 1,4-butanediol and 4-hydroxybutanoic acid, or 4-hydroxybutanoic acid molecules are linked to each other through an ether bond. In this case, an oxygen atom in the formula (2) is shared by the two skeletons each represented by the formula (2). In the case where the skeletons each represented by the formula (2) are linked to each other through a carbonate bond, in the skeletons each represented by the formula (2), 1,4-butanediol molecules, 1,4-butanediol and 4-hydroxybutanoic acid, or 4-hydroxybutanoic acid molecules are linked to each other through a carbonate bond. In this case, oxygen atoms in the two skeletons each represented by the formula (2) are linked to each other through a carbonyl group.

In the repeating structure of the skeletons each represented by the formula (2), the skeletons each represented by the formula (2) may be linked to each other through an ester bond alone, an ether bond alone, or a carbonate bond alone. In addition, the skeletons may be linked to each other through any two bonds selected from the group consisting of an ester bond, an ether bond, and a carbonate bond, or may be linked to each other through all the bonds. The repeating structure of the skeletons each represented by the formula (2) is preferably a repeating structure obtained by linking the skeletons each represented by the formula (2) to each other through an ester bond alone or an ether bond alone.

The skeletons each represented by the formula (3) are each a skeleton derived from neopentyl glycol, hydroxypivalic acid, or dimethylmalonic acid. In the case where the skeletons each represented by the formula (3) are linked to each other through an ester bond, in the skeletons each represented by the formula (3), neopentyl glycol and hydroxypivalic acid, neopentyl glycol and dimethylmalonic acid, the hydroxy group of a hydroxypivalic acid molecule and the carboxy group of another hydroxypivalic acid molecule, or the hydroxy group of hydroxypivalic acid and dimethylmalonic acid are linked to each other through an ester bond. In the case where the skeletons each represented by the formula (3) are linked to each other through an ether bond, in the skeletons each represented by the formula (3), neopentyl glycol molecules, neopentyl glycol and hydroxypivalic acid, or hydroxypivalic acid molecules are linked to each other through an ether bond. In this case, an oxygen atom in the formula (3) is shared by the two skeletons each represented by the formula (3). In the case where the skeletons each represented by the formula (3) are linked to each other through a carbonate bond, in the skeletons each represented by the formula (3), neopentyl glycol molecules, neopentyl glycol and hydroxypivalic acid, or hydroxypivalic acid molecules are linked to each other through a carbonate bond. In this case, oxygen atoms in the two skeletons each represented by the formula (3) are linked to each other through a carbonyl group.

In the repeating structure of the skeletons each represented by the formula (3), the skeletons each represented by the formula (3) may be linked to each other through an ester bond alone, an ether bond alone, or a carbonate bond alone. In addition, the skeletons may be linked to each other through any two bonds selected from the group consisting of an ester bond, an ether bond, and a carbonate bond, or may be linked to each other through all the bonds. The repeating structure of the skeletons each represented by the formula (3) is preferably a repeating structure obtained by linking the skeletons each represented by the formula (3) to each other through an ester bond alone or an ether bond alone.

Although a content ratio between the skeletons each represented by the formula (2) and the skeletons each represented by the formula (3) is not particularly limited, such a content ratio that the equivalent of the skeletons each represented by the formula (2) is from 5 times to 75 times as large as that of the skeletons each represented by the formula (3) is preferred because of the following reasons: as the ratio of the skeletons each represented by the formula (3) becomes larger, the viscosity of the bifunctional urethane (meth)acrylate increases; and meanwhile, as the ratio of the skeletons each represented by the formula (2) becomes larger, the heat deflection temperature of a cured product of the photocurable material composition reduces. In consideration of the viscosity of the bifunctional urethane (meth)acrylate and the characteristics of the cured product, the content ratio is such that the former equivalent is more preferably from 5 times to 50 times, still more preferably from 10 times to 40 times as large as the latter equivalent.

While the skeleton represented by the formula (1) forms a urethane bond contributing to an improvement in impact resistance of the cured product of the photocurable material composition according to one aspect of the present disclosure, an improvement in thermal deformation temperature thereof by the cyclic skeleton can be expected. The skeletons each represented by the formula (2) suppress an increase in viscosity of the photocurable material composition according to one aspect of the present disclosure and moderately form a repeating unit, thereby contributing to the achievement of both of a high thermal deformation temperature of the cured product and an improvement in impact resistance thereof. In addition, the skeletons each represented by the formula (3) have dimethyl groups to limit the molecular motion of the bifunctional urethane (meth)acrylate, thereby contributing to an improvement in thermal deformation temperature of the cured product of the photocurable material composition according to one aspect of the present disclosure. Accordingly, the bifunctional urethane (meth)acrylate preferably includes a structure in which the skeleton represented by the formula (1), the repeating structure of the skeletons each represented by the formula (2), and the repeating structure of the skeletons each represented by the formula (3) are linked to a urethane bond. However, the structure of the bifunctional urethane (meth)acrylate is not limited thereto, and the bifunctional urethane (meth)acrylate may include a structure in which the skeleton represented by the formula (1) and only the repeating structure of the skeletons each represented by the formula (2) are linked to a urethane bond, or a structure in which the skeleton represented by the formula (1) and only the repeating structure of the skeletons each represented by the formula (3) are linked to a urethane bond.

The bifunctional urethane (meth)acrylate has the (meth)acryloyl groups at both of its terminals. The (meth)acryloyl groups may be directly bonded to the skeleton represented by the formula (1), the skeletons each represented by the formula (2), or the skeletons each represented by the formula (3) in the main skeleton, or may be bonded to any such skeleton through a linker. Examples of the linker include a structure derived from a diol having 2 to 10 carbon atoms and a structure derived from a hydroxy acid having 2 to 10 carbon atoms. The bifunctional urethane (meth)acrylate is preferably a bifunctional urethane (meth)acrylate having 2-(meth)acryloyloxy ethoxy groups at both of its terminals, in which the linker is a structure derived from ethylene glycol.

The molecular weight of the bifunctional urethane (meth)acrylate is not particularly limited as long as both of the high thermal deformation temperature and impact resistance of the cured product of the photocurable material composition according to one aspect of the present disclosure are achieved. The molecular weight is 400 or more and 30,000 or less. When the molecular weight is small, the impact resistance of the cured product of the photocurable material composition according to one aspect of the present disclosure reduces, and when the molecular weight is large, the thermal deformation temperature of the cured product of the photocurable material composition according to one aspect of the present disclosure reduces. Therefore, the molecular weight of the bifunctional urethane (meth)acrylate is preferably 1,000 or more and 10,000 or less, more preferably 4,000 or more and 8,000 or less.

In addition, the content of the bifunctional urethane (meth)acrylate in the photocurable material composition according to one aspect of the present disclosure is not particularly limited as long as both of the high thermal deformation temperature and impact resistance of the cured product of the photocurable material composition according to one aspect of the present disclosure are achieved. However, as the content of the bifunctional urethane (meth)acrylate becomes larger, the viscosity of the photocurable material composition increases to reduce the fluidity of a material in an optical three-dimensional shaping method or a cast shaping method, and the reduced fluidity leads to the occurrence of a shaping failure or an increase in number of bubbles to be involved in the material. Accordingly, the content of the bifunctional urethane (meth)acrylate is 50 parts by weight or more and 65 parts by weight or less in consideration of the achievement of both of the high thermal deformation temperature and the impact resistance, and the application of the cured product to the optical three-dimensional shaping method or the cast shaping method.

Next, the compound represented by the formula (4) is described.

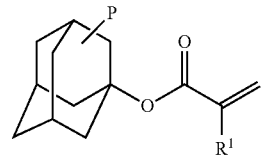

Formula (4)

In the formula (4), $R^1$ represents a hydrogen atom or a methyl group, and P represents a polar group.

The compound represented by the formula (4) is a monofunctional adamantyl (meth)acrylate having at least one polar group.

The polar group is not particularly limited as long as the polar group is a substituent that can form a hydrogen bond, and a substitution position and the number of functional groups are not particularly limited. Specific examples thereof include a hydroxy group, a carboxy group, a sulfonic acid group, a phosphate group, a phosphoric acid group, an ester moiety, a urethane moiety, a urea moiety, an oxime moiety, and a carbonate moiety. Of those, a hydroxy group, an acetyl group, a carboxy group, a sulfonic acid group, a phosphate group, and a phosphoric acid group are preferred, and a hydroxy group is more preferred in consideration of the ease of availability of the material. When the compound represented by the formula (4) has a polar group, hydrogen bonds with the bifunctional urethane (meth)acrylate and structures derived from the compound represented by the formula (5) and the compound represented by the formula (6) can be formed in the cured product. Accordingly, the cured product of the photocurable material composition according to one aspect of the present disclosure can achieve both of a high thermal deformation temperature and impact resistance. In addition, the compound represented by the formula (4) creates a space at a molecular level based on the bulkiness of its adamantane skeleton in the cured product to serve as a cushion against impact. Further, the compound represented by the formula (4) can contribute to an improvement in thermal deformation temperature of the cured product through a reduction in thermal mobility of the cured product by the bulkiness of the adamantane skeleton.

The content of the compound represented by the formula (4) in the photocurable material composition according to one aspect of the present disclosure is not particularly limited as long as the cured product achieves both of a high thermal deformation temperature and impact resistance, and is hence applicable to the optical three-dimensional shaping method or the cast shaping. The content is 15 parts by weight or more and 25 parts by weight or less in consideration of, for example, the solubility of the compound in the photocurable material composition, the viscosity of the photocurable material composition, and the crystallization of the material.

Next, the compound represented by the formula (5) and the compound represented by the formula (6) are described.

cation number", and is represented by "caprolactone n-modified". The ε-caprolactone modification number in the photocurable material composition according to one aspect of the present disclosure is preferably less than 3. Detailed investigations on the thermal deformation temperature and impact resistance of the cured product of the photocurable material composition according to one aspect of the present disclosure have found that the ε-caprolactone modification number is more preferably 1 or less, particularly preferably 0.5 or less.

The compound represented by the formula (5) and the compound represented by the formula (6) in the photocurable material composition are polyfunctional compounds, and contribute to an improvement in thermal deformation temperature of the cured product by its crosslinking. In addition, the compounds achieve an improvement in impact resistance of the cured product through hydrogen bonds with the bifunctional urethane (meth)acrylate and a structure derived from the compound represented by the formula (4), and the planar stacking of their isocyanurate moieties.

The content of the compound represented by the formula (5) and the compound represented by the formula (6) in the photocurable material composition according to one aspect of the present disclosure is not particularly limited as long as the cured product achieves both of a high thermal deformation temperature and impact resistance, and is hence applicable to the optical three-dimensional shaping method or the

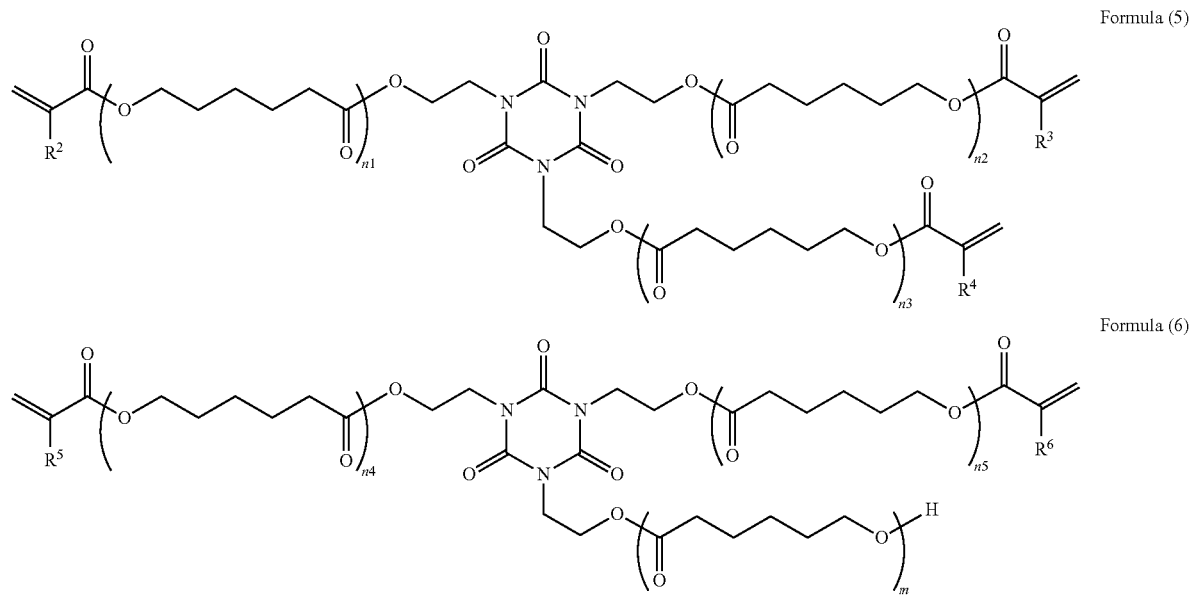

In the formula (5) and the formula (6), $R^2$ to $R^6$ each independently represent a hydrogen atom or a methyl group, "m" represents 0 or 1, n1 to n5 each independently represent an integer of from 0 to 3, n1+n2+n3 is 0 or more and 3 or less, and n4+n5 is 0 or more and 3 or less.

The compound represented by the formula (5) and the compound represented by the formula (6) are each an isocyanurate derivative that may be modified with ε-caprolactone and has (meth)acryloyl groups at its terminals. The ratio of a moiety derived from ε-caprolactone to the total sum of the compound represented by the formula (5) and the compound represented by the formula (6) in the photocurable material composition according to one aspect of the present disclosure is referred to as "ε-caprolactone modificast shaping method. As the content becomes larger, the impact resistance of the cured product reduces, and as the content becomes smaller, the thermal deformation temperature of the cured product reduces. Further, the viscosity of the photocurable material composition changes in accordance with the content of the respective compounds. In order that the cured product may achieve both of the high thermal deformation temperature and the impact resistance to a larger extent, and hence may be applicable to the optical three-dimensional shaping method or the cast shaping method, the content is more preferably 10 parts by weight or more and 30 parts by weight or less.

Next, a cured product according to one aspect of the present disclosure is described.

The cured product according to one aspect of the present disclosure is a cured product obtained by polymerizing the polymerizable functional groups of the photocurable material composition according to one aspect of the present disclosure. The cured product according to one aspect of the present disclosure is characterized by being obtained by adding a polymerization initiator to a photocurable material composition including the following compounds to copolymerize polymerizable functional groups in the photocurable material composition: 50 parts by weight to 65 parts by weight of a bifunctional urethane (meth)acrylate that includes a structure in which a skeleton represented by the formula (1), and at least one of a repeating structure obtained by linking skeletons each represented by the formula (2) to each other through a bond selected from the group consisting of an ester bond, an ether bond, and a carbonate bond, or a repeating structure obtained by linking skeletons each represented by the formula (3) to each other through a bond selected from the group consisting of an ester bond, an ether bond, and a carbonate bond are linked to a urethane bond, and that has (meth)acryloyl groups at both terminals of the structure; 15 parts by weight to 25 parts by weight of a compound represented by the formula (4); and 10 parts by weight to 30 parts by weight of at least one of a compound represented by the formula (5) or a compound represented by the formula (6).

Examples of the polymerization initiator that generates a radical species through light irradiation include, but not limited to, 2-benzyl-2-dimethylamino-1-(4-morpholinophenyl)-1-butanone, 1-hydroxycyclohexyl phenyl ketone, 2-hydroxy-2-methyl-1-phenyl-propan-1-one, bis(2,4,6-trimethylbenzoyl)-phenylphosphine oxide, 4-phenylbenzophenone, 4-phenoxybenzophenone, 4,4'-diphenylbenzophenone, and 4,4'-diphenoxybenzophenone.

In addition, suitable examples of the polymerization initiator that generates a cation species through light irradiation include, but not limited to, polymerization initiators such as iodonium (4-methylphenyl)[4-(2-methylpropyl)phenyl]-hexafluorophosphate.

Further, examples of the polymerization initiator that generates a radical species with heat include, but not limited to: azo compounds, such as azobisisobutyronitrile (AIBN); and peroxides, such as benzoyl peroxide, tert-butyl peroxypivalate, tert-butyl peroxyneohexanoate, tert-hexyl peroxyneohexanoate, tert-butyl peroxyneodecanoate, tert-hexyl peroxyneodecanoate, cumyl peroxyneohexanoate, and cumyl peroxyneodecanoate.

The addition ratio of the polymerization initiator with respect to the photocurable material composition according to one aspect of the present disclosure may be appropriately selected in accordance with the quantity of light to be applied to the composition and an additional heating temperature. In addition, the addition ratio may be adjusted in accordance with the target average molecular weight of the polymer to be obtained. The addition amount of the polymerization initiator to be incorporated into the photocurable material composition according to one aspect of the present disclosure preferably falls within the range of from 0.01 mass % or more to 10.00 mass % or less with respect to the photocurable material composition according to one aspect of the present disclosure. The polymerization initiators may be used alone or in combination thereof.

The photocurable material composition according to one aspect of the present disclosure may further contain an additive, such as a polymerization inhibitor, a photosensitizer, a light stabilizer, a heat stabilizer, an antioxidant, any other polymerizable material, a filler, a releasing agent, or a fungicide, as required.

Examples of the polymerization inhibitor include: hydroquinone-based polymerization inhibitors, such as hydroquinone, hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether, and hydroquinone monoheptyl ether; and phenol-based polymerization inhibitors each having a substituent, such as 3-(3,5-di-tert-butyl-4-hydroxyphenyl)propionate. However, the hydroquinone-based polymerization inhibitors, such as hydroquinone, and benzoquinone-based polymerization inhibitors, such as benzoquinone, are not suitable because the above-mentioned polymerization inhibitors may be yellowed by UV irradiation.

Examples of the polymerization inhibitor include, but not limited to, the above-mentioned examples of the polymerization inhibitor at the time of the reaction or at the time of the storage. The addition amount of the polymerization inhibitor preferably falls within the range of from 0.01 mass % or more to 1.00 mass % or less with respect to the photocurable material composition according to one aspect of the present disclosure. In addition, the polymerization initiators may be used alone or in combination thereof. In consideration of a low degree of coloring of the composition, specifically, the hydroquinone-based polymerization inhibitors are preferably utilized in combination.

Examples of the photosensitizer include benzophenone, 4,4-diethylaminobenzophenone, 1-hydroxycyclohexyl phenyl ketone, isoamyl p-dimethylaminobenzoate, methyl 4-dimethylaminobenzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropan-1-one, and acylphosphine oxides. The addition amount of the photosensitizer preferably falls within the range of from 0.01 mass % or more to 10.00 mass % or less with respect to the photocurable material composition according to one aspect of the present disclosure.

The light stabilizer is not particularly limited as long as the light stabilizer does not have a large influence on the characteristics of the cured product, and examples thereof include: benzotriazole-based compounds, such as 2-(2H-benzotriazol-2-yl)-p-cresol, 2-(2H-benzotriazol-2-yl)-4,6-bis(1-methyl-1-phenyl ethyl)phenol, 2-[5-chloro(2H)-benzotriazol-2-yl]-4-methyl-6-(tert-butyl)phenol, 2-(2H-benzotriazol-2-yl)-4,6-di-tert-pentylphenol, 2-(2H-benzotriazol-2-yl)-4-(1,1,3,3-tetramethylbutyl)phenol, 2,2'-methylenebis[6-(2H-benzotriazol-2-yl)]-4-(1,1,3,3-tetramethylbutyl)phenol, and 2-(2H-benzotriazol-2-yl)-6-dodecyl-4-methylphenol; cyanoacrylate-based compounds, such as ethyl 2-cyano-3,3-diphenylacrylate and 2-ethylhexyl 2-cyano-3,3-diphenylacrylate; triazine-based compounds; and benzophenone-based compounds, such as octabenzone and 2,2'-4,4'-tetrahydrobenzophenone. The light stabilizer may also serve as the photosensitizer, and in that case, the photosensitizer may not be added. The addition amount of the light stabilizer preferably falls within the range of from 0.01 mass % or more to 10.00 mass % or less with respect to the photocurable material composition according to one aspect of the present disclosure.

The heat stabilizer is not particularly limited as long as the heat stabilizer does not have a large influence on the characteristics of the cured product, and examples thereof include: alkyl esters with 7 to 9 carbon atoms having a side chain of pentaerythritol tetrakis[3-(3,5-di-tert-butyl-4-hydroxyphenyl)]propionate, octadecyl-3-(3,5-di-tert-butyl-4-hydroxyphenyl)propionate, or 3,5-bis(1,1-dimethylethyl)-4-hydroxybenzenepropanoic acid; hindered phenol-based compounds, such as 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)]propionate, and hexamethylenebis[3-(3,5-di-tert-butyl-4-hydroxyphenyl)] propionate; phosphorus-based compounds, such as tris(2,4-di-tert-butylphenyl)phosphite; and sulfur-based compounds, such as dioctadecyl-3,3'-thiodipropionate. The addition amount of the heat stabilizer preferably falls within the range of from 0.01 mass % or more to 10.00 mass % or less with respect to the photocurable material composition according to one aspect of the present disclosure.

The antioxidant is not particularly limited as long as the antioxidant does not have a large influence on the characteristics of the cured product, and examples thereof include hindered amine-based compounds, such as bis(2,2,6,6-tetramethyl-4-piperidyl) sebacate and bis(1,2,2,6,6-pentamethyl-4-piperidyl)[[3,5-bis(1,1-dimethylethyl)-4-hydroxyphenyl]methyl]butyl malonate. The addition amount of the antioxidant preferably falls within the range of from 0.01 mass % or more to 10.00 mass % or less with respect to the photocurable material composition according to one aspect of the present disclosure.

In addition, any other polymerizable material, a filler, or the like may be added to the photocurable material composition according to one aspect of the present disclosure for adjusting the viscosity of the photocurable material composition or imparting a function thereto to the extent that a remarkable reduction in performance of the cured product does not occur. The addition amount of the polymerizable material, which varies depending on the photocurable material composition to which the material is added, preferably falls within the range of from 1.0 mass % or more to 40.0 mass % or less. When the addition amount is small, the effect of adding the polymerizable material is not obtained. In addition, when the addition amount is large, the mechanical characteristics of the cured product at the time of the curing of the photocurable material composition reduce. Accordingly, the addition amount is more preferably 1.0 mass % or more and 20.0 mass % or less. The polymerizable material is not particularly limited, and is a (meth)acrylate compound that is monofunctional or bifunctional or more, or an epoxy or oxetane compound that is monofunctional or bifunctional or more.

Examples of the (meth)acrylate compound that is monofunctional or bifunctional or more include, but not limited to, 2-ethylhexyl (meth)acrylate, 2-hydroxyethyl (meth)acrylate, 2-hydroxypropyl (meth)acrylate, lauryl (meth)acrylate, stearyl (meth)acrylate, isooctyl (meth)acrylate, tetrahydrofurfuryl (meth)acrylate, isobornyl (meth)acrylate, benzyl (meth)acrylate, ethylene glycol di(meth)acrylate, propylene glycol di(meth)acrylate, trimethylolpropane tri(meth)acrylate, ditrimethylolpropane tetra(meth)acrylate, pentaerythritol tetra(meth)acrylate, dipentaerythritol tri(meth)acrylate, dipentaerythritol penta(meth)acrylate, dipentaerythritol hexa(meth)acrylate, phenoxyethyl (meth)acrylate, phenoxypolyethylene glycol (meth)acrylate, morpholine (meth)acrylate, phenylglycidyl (meth)acrylate, isodecyl (meth)acrylate, tridecyl (meth)acrylate, ethoxydiethylene glycol (meth)acrylate, methoxyditripropylene glycol (meth)acrylate, tricyclodecane (meth)acrylate, dicyclopentadieneoxy ethyl (meth)acrylate, dicyclopentenyl (meth)acrylate, dicyclopentenyl oxyethyl (meth)acrylate, dicyclopentanyl (meth)acrylate, 2-methyl-2-adamantyl (meth)acrylate, 2-ethyl-2-adamantyl (meth)acrylate, 1-adamantyl (meth)acrylate, cyclohexane-1,4-dimethanol di(meth)acrylate, cyclohexane-1,3-dimethanol di(meth)acrylate, tricyclodecane dimethylol di(meth)acrylate, dioxane glycol di(meth)acrylate, neopentyl glycol di(meth)acrylate, an alkylene oxide-modified 1,6-hexanediol di(meth)acrylate, an alkylene oxide-modified neopentyl glycol di(meth)acrylate, hydroxypivalic acid neopentyl glycol di(meth)acrylate, 1,9-nonanediol di(meth) acrylate, polyethylene glycol di(meth)acrylate, polypropylene glycol di(meth)acrylate, and ethylene oxide-modified bisphenol A-type di(meth)acrylate, which may be used in combination thereof.

In addition, examples of the epoxy or oxetane compound that is monofunctional or bifunctional or more include, but not limited to, hydrogenated bisphenol A diglycidyl ether, hydrogenated bisphenol F diglycidyl ether, hydrogenated bisphenol AD diglycidyl ether, hydrogenated bisphenol Z diglycidyl ether, cyclohexane dimethanol diglycidyl ether, tricyclodecane dimethanol diglycidyl ether, 3,4-epoxycyclohexylmethyl-3',4'-epoxycyclohexane carboxylate, 3,4-epoxy-1-methylcyclohexyl-3,4-epoxy-1-methyl cyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-m-dioxane, bis(3,4-epoxycyclohexylmethyl) adipate, 3,4-epoxy-6-methylcyclohexyl carboxylate, dicyclopentadiene diepoxide, ethylene bis(3,4-epoxycyclohexanecarboxylate), dioctyl epoxyhexahydrophthalate, di-2-ethylhexyl epoxyhexahydrophthalate, ε-caprolactone-modified 3',4'-epoxycyclohexylmethyl 3,4-epoxycyclohexanecarboxylate, a 1,2-epoxy-4-(2-oxiranyl)cyclohexane adduct of 2,2-bis (hydroxymethyl)-1-butanol, bis(3,4-epoxycyclohexyl) methane, 2,2-bis(3,4-epoxycyclohexyl)propane, 1,1-bis(3,4-epoxycyclohexyl)ethane, alpha-pinene oxide, campholenaldehyde, limonene monooxide, limonene dioxide, 4-vinylcyclohexene monooxide, 4-vinylcyclohexene dioxide, 3-hydroxymethyl-3-methyloxetane, 3-hydroxymethyl-3-ethyloxetane, 3-hydroxymethyl-3-propyloxetane, 3-hydroxymethyl-3-n-butyl oxetane, and 3-hydroxymethyl-3-propyloxetane.

In addition, when the epoxy or oxetane compound is added, a photoacid generator or a photobase generator may be added to the photocurable material composition to promote a polymerization reaction of the epoxy or oxetane compound. Examples of the photoacid generator include, but not limited to, a triarylsulfonium hexafluoroantimonate, triphenylphenacylphosphonium tetrafluoroborate, triphenylsulfonium hexafluoroantimonate, bis[4-(diphenylsulfonio)phenyl]sulfide bisdihexafluoroantimonate, bis-[4-(di-4'-hydroxyethoxyphenylsulfonio)phenyl]sulfide bisdihexafluoroantimonate, bis-[4-(diphenyl sulfonio)phenyl]sulfide bisdihexafluorophosphate, and diphenyliodonium tetrafluoroborate.

The filler is not particularly limited, and only needs to be free from deteriorating the mechanical characteristics of the cured product, and its content is 1.0 mass % or more and 50.0 mass % or less. The content is preferably 1.0 mass % or more and 20.0 mass % or less in consideration of the handleability of the filler at the time of the production of the cured product. The kind of the filler is, for example, a metal salt, a metal oxide, polymer fine particles, an inorganic fiber, an organic fiber, or carbon. Examples of the metal oxide include, but not limited to, silicon oxide, titanium oxide, and aluminum oxide. Examples of the polymer fine particles include, but not limited to, acrylic fine particles, polystyrene fine particles, and nylon particles. Examples of the organic fiber include, but not limited to, nylon fiber and cellulose nanofiber.

In the photocurable material composition according to one aspect of the present disclosure, the additives are preferably incorporated at a content in the range of from 0.01 mass % or more to 50.00 mass % or less with respect to the photocurable material composition according to one aspect of the present disclosure.

A method of preparing the photocurable material composition according to one aspect of the present disclosure is not particularly limited, and a method involving weighing all materials and then stirring the materials under heating is simplest. However, when a concern is raised about the polymerization of the materials by the heating, a polymerization inhibitor may be appropriately added. In addition, when it is difficult to uniformly mix the materials only through the heating, the composition may be prepared by: dissolving all the materials in a solvent, such as acetone; and then removing the solvent by distillation.

Any one of the conventionally known optical three-dimensional shaping methods and apparatus may be used as a method of producing the cured product using the photocurable material composition according to one aspect of the present disclosure. A method involving repeating the following lamination operation to finally obtain a target three-dimensional shaped article is preferred: an active energy ray is selectively applied to the photocurable material composition so that a cured layer having a desired pattern based on slice data on a target three-dimensional shaped article may be obtained, to thereby form the cured layer; next, an uncured liquid photocurable resin composition is supplied to the cured layer; and the active energy ray is similarly applied to the material to newly form a cured layer continuous with the cured layer. The slice data is data generated by slicing three-dimensional data on the target three-dimensional shaped article at a predetermined pitch with commercial slicing software.

Examples of the active energy ray may include UV light, an electron beam, an X-ray, a radiation, and a high-frequency wave. Of those, UV light having a wavelength of from 300 nm to 430 nm is preferably used from an economic viewpoint, and a UV laser (e.g., a semiconductor excitation solid laser, an Ar laser, or a He—Cd laser), a high-pressure mercury lamp, an ultrahigh-pressure mercury lamp, a mercury lamp, a xenon lamp, a halogen lamp, a metal halide lamp, a UV light-emitting diode (LED), a fluorescent lamp, or the like may be used as a light source at that time.

At the time of the application of the active energy ray to a shaping surface formed of the photocurable material composition to form each cured resin layer having a predetermined shape pattern, the cured resin layer may be formed by a dot-drawing or line-drawing system through the use of an active energy ray condensed into a dot shape, such as laser light, or a shaping system involving applying the active energy ray in a planar manner to the shaping surface through a planar drawing mask formed by arraying a plurality of micro light shutters, such as liquid crystal shutters or digital micromirror shutters (DMDs), to form the cured resin layer may be adopted.

The photocurable material composition according to one aspect of the present disclosure may be widely used in an optical three-dimensional shaping field, and its application field is by no means limited. However, typical examples of the application field may include: a model for examining an external appearance design during design; a model for checking the functionality of a part; a resin mold for producing a casting mold; a base model for producing a mold; and a direct mold for a prototype mold. In particular, the photocurable material composition according to one aspect of the present disclosure may be used as a part required to have durability because the composition achieves both of a high thermal deformation temperature and impact resistance.

A method involving using the cast shaping method is also given as an example of the method of producing the cured product of the photocurable material composition according to one aspect of the present disclosure. When the cured product is obtained by the cast shaping method, not only a shaped article obtained in the optical three-dimensional shaping field but also a high-precision shaped article that cannot be achieved in the optical three-dimensional shaping field can be provided from the photocurable material composition. As a method of providing the cured product at that time, shaping may be performed by: pouring the material composition according to one aspect of the present disclosure into a mold; mounting a transparent substrate having a size matching that of the mold on the mold; and applying an active energy ray to the material composition through the transparent substrate. At that time, when the transfer failure of the shape of the mold occurs owing to the curing shrinkage of the photocurable material composition, a method involving applying the active energy ray while pressurizing the composition, or a method involving repeating the pouring and curing of the material composition little by little to provide a desired shaped article like the optical three-dimensional shaping may be selected.

EXAMPLES

The present disclosure is described in more detail below by way of Examples. The present disclosure is by no means limited to Examples described below without departing from the gist of the present disclosure.

Example 1

(1) Production of Photocurable Material Composition 30.6 Grams of a bifunctional urethane (meth)acrylate (product name: KAYARAD UX-6101, manufactured by Nippon Kayaku Co., Ltd., average molecular weight: 6,500), 10.2 g of a compound represented by the formula (4), the compound having at least one polar group (product name: DIAPURESTE HADM, manufactured by Mitsubishi Gas Chemical Company, Inc.), 7.2 g of caprolactone 0.5-modified tris(2-methacryloyloxyethyl) isocyanurate serving as a compound represented by the formula (5) and a compound represented by the formula (6), and 0.96 g of bis(2,4,6-trimethylbenzoyl)-phenylphosphine oxide (product name: IRGACURE 819, manufactured by BASF) serving as a polymerization initiator were weighed in a brown glass bottle (product name: BR-23FH, manufactured by Taitec Corporation), and were stirred under heating at 90° C. for 5 hours to provide a photocurable material composition of Example 1.

(2) Production of Evaluation Sample (2a) Production of Sample of Cast Shaped Article A mold framed into a size measuring 4 mm by 10 mm by 80 mm was arranged on a quartz plate having applied thereto a release agent. The photocurable material composition was poured into the mold, and another quartz plate having applied thereto a release agent was arranged so that the composition was sandwiched and fixed between the plates.

Light having a wavelength of 405 nm was applied to each of the front surface and rear surface of the photocurable material composition at 10 mW for 120 seconds twice through the use of a UV integral light counter (product name: UTI-250, manufactured by Ushio Inc.) to cure the photocurable material composition. After that, a prismatic shaped article was released from the mold. The resultant shaped article was subjected to a heat treatment at 50° C. for 1 hour, and was then subjected to a heat treatment at 80° C. for 1 hour to provide a temporary evaluation sample. Subsequently, under a state in which the temporary evaluation sample was heated to 100° C., light having a wavelength of 405 nm was further applied thereto at 20 mW for 1,000 seconds through the use of the UV integral light counter (product name: UTI-250, manufactured by Ushio Inc.). Thus, an evaluation sample of a cast shaped article was obtained.

(3) Evaluation Method

The evaluation sample was evaluated for its heat deflection temperature (thermal deformation temperature) with a HDT tester manufactured by Toyo Seiki Seisaku-sho, Ltd., and for its Charpy impact strength (impact resistance) with an impact tester and a notching machine manufactured by Toyo Seiki Seisaku-sho, Ltd., under test conditions in accordance with Method A of JIS K 7191-1 and JIS K 7111-1, and was judged by the following criteria. The results are shown in Table 1.

(Evaluation Criteria)

A: The heat deflection temperature is 70° C. or more, and the Charpy impact strength is 8 kJ/m$^2$ or more.

B: The heat deflection temperature is 70° C. or more, and the Charpy impact strength is 6 kJ/m$^2$ or more and less than 8 kJ/m$^2$.

C: The heat deflection temperature is less than 70° C., and the Charpy impact strength is less than 6 kJ/m$^2$.

An evaluation sample corresponding to the evaluation criterion A had a heat deflection temperature and a Charpy impact strength comparable to those of an ABS resin. In addition, an evaluation sample corresponding to the evaluation criterion B had a heat deflection temperature and a Charpy impact strength exceeding those of a cured product obtained from a related-art resin composition for optical three-dimensional shaping, though the temperature and the strength were not comparable to those of the ABS resin. Meanwhile, an evaluation sample corresponding to the evaluation criterion C had a heat deflection temperature and a Charpy impact strength comparable to those of the cured product obtained from the related-art resin composition for optical three-dimensional shaping.

Example 2

(1) Production of Photocurable Material Composition

The raw materials were weighed at addition ratios shown in Table 1, and 0.96 g of IRGACURE 819 manufactured by BASF was further weighed as a polymerization initiator by the same method as that described in Example 1. The materials were loaded into a brown bottle, and were stirred under heating at 90° C. for 5 hours. A sample was produced from the resultant photocurable material composition by the following method, followed by its evaluation.

(2) Production of Evaluation Sample (2b) Production of Sample by Optical Three-dimensional Shaping A prism measuring 4 mm by 10 mm by 80 mm was shaped with an optical shaping machine (product name: ML-48, manufactured by Mutoh Engineering Inc.). With regard to a shaping condition, the time period for which each layer was irradiated with UV light was set to 40 seconds. The prism was subjected to a heat treatment at 50° C. for 1 hour, and was then subjected to a heat treatment at 80° C. for 1 hour to provide a temporary evaluation sample. Under a state in which the temporary evaluation sample was heated to 100° C., light having a wavelength of 405 nm was further applied thereto at 20 mW for 1,000 seconds through the use of a UV integral light counter (product name: UTI-250, manufactured by Ushio Inc.). Thus, an evaluation sample obtained by optical three-dimensional shaping was obtained.

(3) Evaluation Method

The resultant evaluation sample was evaluated by the same method and evaluation criteria as those of Example 1. The results are shown in Table 1.

Examples 3 to 12

In Examples 3 to 12, photocurable material compositions were each prepared by the same method as that described in Example 1 by: weighing the raw materials for the photocurable material composition at addition ratios shown in Table 1; and further weighing 2 wt % of the polymerization initiator.

Evaluation samples were produced by the method described in the section "(2a) Production of Sample of Cast Shaped Article" in Examples 3, 5, and 7 to 12, and by the method described in the section "(2b) Production of Sample by Optical Three-dimensional Shaping" in Examples 4 and 6, through the use of the resultant photocurable material compositions, followed by their evaluations. The respective evaluation results were as shown in Table 1.

The following isocyanurate derivatives were each used as the compound represented by the formula (5) and the compound represented by the formula (6).

Isocyanurate derivative A: caprolactone 0.5-modified tris(2-methacryloyloxyethyl) isocyanurate (molecular weight: 508.52)

Isocyanurate derivative B: 1:1 mixture of tris(2-acryloyloxyethyl) isocyanurate and bis(2-acryloyloxyethyl)-2-hydroxyethyl isocyanurate (average molecular weight: 396.35)

Isocyanurate derivative C: tris(2-acryloyloxyethyl) isocyanurate (molecular weight: 423.37)

Isocyanurate derivative D: caprolactone 0.3-modified tris(2-acryloyloxyethyl) isocyanurate (molecular weight: 449.21)

Isocyanurate derivative E: caprolactone 0.8-modified tris(2-acryloyloxyethyl) isocyanurate (molecular weight: 492.28)

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bifunctional urethane (meth)acrylate [wt %] | 63 | 59 | 55 | 63 | 55 | 59 | 59 | 59 | 63 | 55 | 49 | 64 |
| Compound represented by formula (4) [wt %] | 20 | 20 | 19 | 20 | 19 | 20 | 20 | 20 | 15 | 24 | 20 | 24 |

TABLE 1-continued

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Isocyanurate derivative A [wt %] | 15 | 19 | 24 | — | — | — | — | — | — | — | — | — |
| Isocyanurate derivative B [wt %] | — | — | — | 15 | 24 | — | — | — | — | — | — | — |
| Isocyanurate derivative C [wt %] | — | — | — | — | — | 19 | — | — | 20 | 19 | 29 | 10 |
| Isocyanurate derivative D [wt %] | — | — | — | — | — | — | 19 | — | — | — | — | — |
| Isocyanurate derivative E [wt %] | — | — | — | — | — | — | — | 19 | — | — | — | — |
| Heat deflection temperature [° C.] | 77 | 83 | 89 | 75 | 91 | 81 | 84 | 75 | 75 | 93 | 95 | 74 |
| Charpy impact strength [kJ/m$^2$] | 9 | 7 | 7 | 11 | 6 | 8 | 8 | 9 | 9 | 6 | 6 | 12 |
| Comprehensive evaluation | A | B | B | A | B | A | A | A | A | B | B | A |

Comparative Examples 1 to 5

In Comparative Examples 1 to 5, photocurable material compositions were each prepared by weighing the raw materials for the photocurable material composition at addition ratios shown in Table 2 and further weighing 2 wt % of the polymerization initiator by the same method as that described in Example 1 except that the isocyanurate derivative A was changed to the isocyanurate derivative C. Evaluation samples were produced by the method described in the section "(2a) Production of Sample of Cast Shaped Article" through the use of the resultant photocurable material compositions, followed by their evaluations. The respective evaluation results were as shown in Table 2.

TABLE 2

| | Comparative Example | | | | |
|---|---|---|---|---|---|
| | 1 | 2 | 3 | 4 | 5 |
| Bifunctional urethane (meth)acrylate [wt %] | 69 | 66 | 59 | 44 | 49 |
| Compound represented by formula (4) [wt %] | 10 | 4 | 29 | 25 | 15 |
| Isocyanurate derivative C [wt %] | 19 | 8 | 10 | 29 | 34 |
| Heat deflection temperature [° C.] | 65 | 58 | 66 | 88 | 95 |
| Charpy impact strength [kJ/m$^2$] | 17 | 15 | 9 | 5 | 5 |
| Comprehensive evaluation | C | C | C | C | C |

Comparative Example 6

A sample was produced and evaluated in exactly the same manner as that described in Example 1 except that pentaerythritol acrylate was used instead of the isocyanurate derivative A. The evaluation results are shown in Table 3.

Comparative Example 7

A sample was produced and evaluated in exactly the same manner as that described in Example 1 except that DIAPURESTE HADM manufactured by Mitsubishi Gas Chemical Company, Inc. was used instead of the isocyanurate derivative A. The evaluation results are shown in Table 3.

Comparative Example 8

A sample was produced and evaluated in exactly the same manner as that described in Example 1 except that caprolactone 3-modified tris(2-acryloyloxyethyl) isocyanurate was used instead of the isocyanurate derivative A. The evaluation results are shown in Table 3.

Comparative Example 9

A sample was produced and evaluated in exactly the same manner as that described in Example 1 except that BNP-1 manufactured by Nippon Kayaku Co., Ltd. was used instead of the isocyanurate derivative A. The evaluation results are shown in Table 3.

Comparative Example 10

A sample was produced and evaluated in exactly the same manner as that described in Example 1 except that adamantyl methacrylate was used instead of the DIAPURESTE HADM manufactured by Mitsubishi Gas Chemical Company, Inc. that was the compound represented by the formula (4). The evaluation results are shown in Table 3.

Comparative Example 11

A sample was produced and evaluated in exactly the same manner as that described in Example 1 except that isobornyl methacrylate was used instead of the DIAPURESTE HADM manufactured by Mitsubishi Gas Chemical Company, Inc. that was the compound represented by the formula (4). The evaluation results are shown in Table 3.

Comparative Example 12

A sample was produced and evaluated in exactly the same manner as that described in Example 1 except that KAYARAD R-381 manufactured by Nippon Kayaku Co., Ltd. was used instead of the caprolactone 0.5-modified tris(2-methacryloyloxyethyl) isocyanurate (derivative A). The evaluation results are shown in Table 3.

Comparative Example 13

A sample was produced and evaluated in exactly the same manner as that described in Example 1 except that KAYARAD UX-3204 manufactured by Nippon Kayaku Co., Ltd. was used instead of the KAYARAD UX-6101 manufactured by Nippon Kayaku Co., Ltd. as the bifunctional urethane (meth)acrylate. The evaluation results are shown in Table 3.

Comparative Example 14

A sample was produced and evaluated in exactly the same manner as that described in Example 1 except that KUA PC2I manufactured by KSM Co., Ltd. was used instead of the KAYARAD UX-6101 manufactured by Nippon Kayaku Co., Ltd. as the bifunctional urethane (meth)acrylate. The evaluation results are shown in Table 3.

TABLE 3

|  | Comparative Example | | | | | | | | |
|---|---|---|---|---|---|---|---|---|---|
|  | 6 | 7 | 8 | 9 | 10 | 11 | 12 | 13 | 14 |
| Heat deflection temperature [° C.] | 64 | 69 | 60 | 58 | 69 | 61 | 55 | 52 | 43 |
| Charpy impact strength [kJ/m$^2$] | 8 | 5 | 11 | 9 | 6 | 6 | 13 | 15 | 23 |
| Comprehensive evaluation | C | C | C | C | C | C | C | C | C |

The photocurable material composition and the cured product according to one aspect of the present disclosure each have a higher thermal deformation temperature and higher impact resistance than those of a related-art material cured by an active energy ray. In addition, the composition and the cured product may each be used as a material for optical three-dimensional shaping. Accordingly, the composition and the cured product may each be utilized in the production of a part required to have durability through the use of an optical three-dimensional shaping method or a cast shaping method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-216483, filed Nov. 19, 2018, which is hereby incorporated by reference herein in its entirety.

What is claimed is:

1. A photocurable material composition comprising:

50 parts by weight to 65 parts by weight of a bifunctional urethane (meth)acrylate that includes a structure in which a skeleton represented by formula (1), and at least one of a repeating structure obtained by linking skeletons each represented by formula (2) to each other through a bond selected from the group consisting of an ester bond, an ether bond, and a carbonate bond and a repeating structure obtained by linking skeletons each represented by formula (3) to each other through a bond selected from the group consisting of an ester bond, an ether bond, and a carbonate bond are linked to a urethane bond, and that has (meth)acryloyl groups at both terminals of the structure;

15 parts by weight to 25 parts by weight of a compound represented by formula (4); and 10 parts by weight to 30 parts by weight of at least one of a compound represented by formula (5) and a compound represented by formula (6):

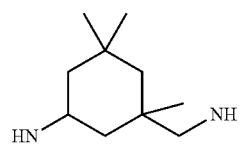
(1)

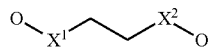
(2)

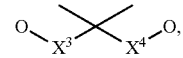
(3)

wherein, in the formula (1) to the formula (3), $X^1$ to $X^4$ each independently represent $CH_2$ or $C=O$, provided that, when oxygen atoms to which $X^1$ to $X^4$ are bonded each form a urethane bond or a carbonate bond, $X^1$ to $X^4$ each represent $CH_2$;

Formula (4)

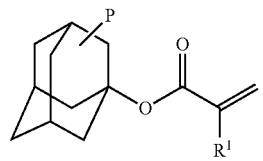

wherein, in the formula (4), $R^1$ represents a hydrogen atom or a methyl group, and P represents a polar group;

Formula (5)

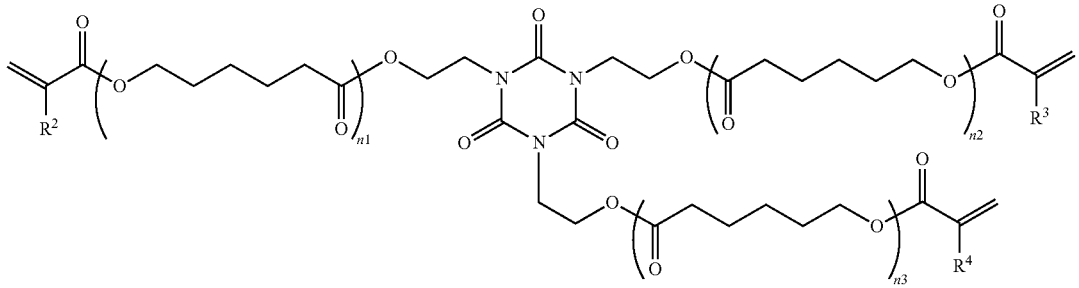

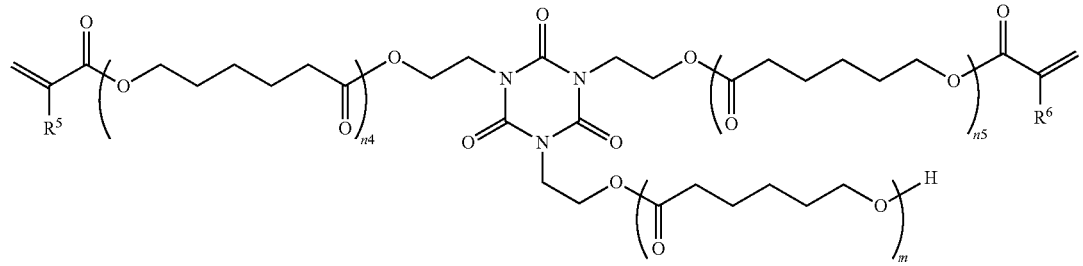

Formula (6)

wherein, in the formula (5) and the formula (6), $R^2$ to $R^6$ each independently represent a hydrogen atom or a methyl group, m represents 0 or 1, n1+n2+n3 is 0 to less than 3, and n4+n5 is 0 to less than 3.

2. The photocurable material composition according to claim 1, wherein the polar group is one of a hydroxy group, an acetyl group, a carboxy group, a sulfonic acid group, a phosphate group, and a phosphoric acid group.

3. The photocurable material composition according to claim 1, wherein the polar group is a hydroxy group.

4. The photocurable material composition according to claim 1, wherein the skeletons each represented by the formula (2) are linked to each other through an ester bond, and the skeletons each represented by the formula (3) are linked to each other through an ester bond.

5. The photocurable material composition according to claim 1, wherein the skeletons each represented by the formula (2) are linked to each other through an ether bond, and the skeletons each represented by the formula (3) are linked to each other through an ether bond.

6. The photocurable material composition according to claim 1, wherein the bifunctional urethane (meth)acrylate has a molecular weight of 400 to 30,000.

7. The photocurable material composition according to claim 1, wherein the bifunctional urethane (meth)acrylate has a molecular weight of 4,000 to 8,000.

8. The photocurable material composition according to claim 1, wherein the bifunctional urethane (meth)acrylate has 2-(meth)acryloyloxyethoxy groups at both terminals thereof.

9. The photocurable material composition according to claim 1, wherein n1+n2+n3 is from 0 to 1, and n4+n5 is from 0 to 1.

* * * * *